Figure 1:
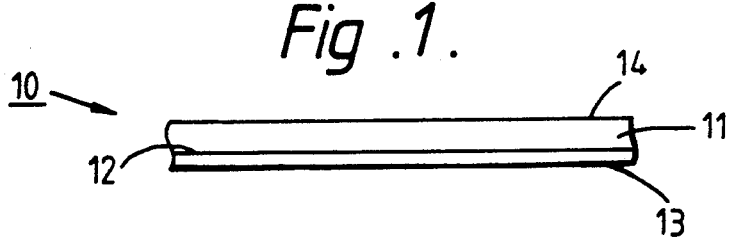

United States Patent [19]

Higgins

[11] Patent Number: 5,082,704
[45] Date of Patent: Jan. 21, 1992

[54] RELEASE FILM

[75] Inventor: David E. Higgins, Whitby, England

[73] Assignee: Imperial Chemical Industries PLC, London, England

[21] Appl. No.: 348,400

[22] Filed: May 8, 1989

[30] Foreign Application Priority Data

May 19, 1988 [GB] United Kingdom ............... 8811868

[51] Int. Cl.⁵ .................. A61F 13/02; E04D 1/00
[52] U.S. Cl. .................................. 428/40; 428/141; 428/423.7; 428/489; 52/518; 52/540
[58] Field of Search ............ 428/423.7, 141, 40, 428/489; 52/518, 540

[56] References Cited

U.S. PATENT DOCUMENTS 4,413,086  11/1983  Chang et al.
4,741,961  5/1988  Frisch.

FOREIGN PATENT DOCUMENTS 2577935  8/1986  France ........................... 428/423.3
1547834  6/1979  United Kingdom.
2140444  11/1984  United Kingdom.

Primary Examiner—Edith L. Buffalow
Attorney, Agent, or Firm—Cushman, Darby & Cushman

[57] ABSTRACT

A release film comprising an oriented film substrate having an abherent surface layer comprising a chain extended polyurethane resin derived from an isocyanate-reactive polydialkyl siloxane.

A preferred substrate is a biaxially oriented polyethylene terephthalate film, and the release film is of particular utility in the production of asphalt roofing materials.

9 Claims, 1 Drawing Sheet

RELEASE FILM

This invention relates to a release film and to a method for the production thereof.

Abherents or release agents are generally solid or liquid film-forming materials employed to reduce or prevent adhesion between two surfaces. They are employed in a variety of industrial processes, including metal casting, food preparation and packaging, polymer processing and paper coating, and in the production of moulded resin articles, stamping foils and pressure-sensitive adhesive tapes. Typical abherents include natural and synthetic waxes, metal salts of fatty acids, particularly stearic acid, and polymers, such as polyvinylalcohols, polyamides and polyolefins.

An abherent is conveniently employed in association with a polymeric support film. For example, GB-A-1590592 discloses a mould release foil, suitable for use in the production of moulded articles from a curable resin, the foil comprising a self-supporting thermoplastics film coated on one or both surfaces with a continuous release layer formed from an interpolymer of styrene or a derivative thereof with a film-forming comonomer, such as acrylic acid, methacrylic acid or an alkyl ester thereof.

Similarly, U.S. Pat. No. 4447500 discloses a release composition for asphalt roofing materials, such as asphalt shingles and asphalt roll roofing, the composition comprising a mixture of fatty acid monoalkanolamides, such as the monoethanolamides of stearic acid and coconut fatty acid. The composition is suitably provided on the outer surface of a plastics release tape bonded to the underside of the shingle sheet material and positioned to engage with an adhesive strip on an adjacent shingle when the shingles are assembled into a stack.

When associated with a supporting film substrate an abherent must satisfy apparently conflicting criteria, by bonding firmly to the film substrate while providing easy and complete release from an opposing surface. Silicones, based on a silicon-oxygen polymer backbone with pendant aliphatic or aromatic carbon side chains, have assumed importance as abherents in recent years, and generally confer excellent release characteristics. However, with such materials it has proved difficult to achieve adequate adhesion to the film substrate. Furthermore, such materials, when applied to a film substrate during production thereof are frequently liable to evolve siliceous debris, which not only constitutes a health hazard, possibly necessitating the wearing of dust masks and protective clothing by plant operatives, but also, and importantly, severely contaminates the film production line and renders it unsuitable for the subsequent production of alternative film grades. Such debris are also detrimental to the performance of any adhesive medium which may be associated with the film structure.

We have now devised an improved release film which eliminates or substantially overcomes the aforementioned problems.

Accordingly, the present invention provides a release film comprising a self-supporting, polymeric film substrate having on at least one surface thereof, a polymeric abherent layer wherein the abherent layer comprises a polyurethane resin which is the reaction product of:

(A) a prepolymer obtained by reacting:
  (i) an organic polyisocyanate,
  (ii) a polydialkylsiloxane having at least two isocyanate-reactive groups, and
  (iii) a compound containing a hydrophilic centre and at least two isocyanate and/or isocyanate-reactive groups,
and
(B) a polyfunctional chain extender.

The invention further provides a method of producing a release film comprising applying an abherent medium to at least one surface of a self-supporting, polymeric film substrate, the abherent medium being applied before, during or after, any stretching operation employed to effect molecular orientation of the film substrate, and drying the applied medium to form a polymeric 30 abherent layer, wherein the abherent medium comprises a dispersion of a polyurethane resin which is the reaction product of:

(A)
  (i) an organic polyisocyanate,
  (ii) a polydialkylsiloxane having at least two isocyanate-reactive groups, and
  (iii) a compound containing a hydrophilic centre and at least two isocyanate and/or isocyanate-reactive groups,
and
(B) a polyfunctional chain extender.

The invention still further provides an asphalt roofing sheet having bonded to at least one surface thereof a release film as defined in either of the two immediately preceding paragraphs.

By a "self-supporting film" is meant a film capable of independent existence in the absence of a supporting base.

The organic polyisocyanate used in making the prepolymer may be an aliphatic, cycloaliphatic, araliphatic or aromatic polyisocyanate. Examples of suitable polyisocyanates include ethylene diisocyanate, 1,6-hexamethylene diisocyanate, isophorone diisocyanate, cyclohexane-1,4-diisocyanate, 4-4'-dicyclohexylmethane diisocyanate, p-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. Mixtures of polyisocyanates may be used and also polyisocyanates which have been modified by the introduction of urethane, allophanate, urea, biuret, carbodiimide, uretonimine or isocyanurate residues.

Polydialkylsiloxanes in which the alkyl group contains from 1 to 6 carbon atoms, particularly a methyl group, and having at least two isocyanate-reactive groups are known. These include polydimethylsiloxanes having two or more reactive groups selected from hydroxy, mercapto, primary amino, secondary amino and carboxy groups. The polydialkylsiloxane may be linear, for example a diol having a hydroxy group at each end, or it may be branched, having three or more isocyanate-reactive groups which may be situated at the various ends of the molecule or may all be located at one end.

Examples of suitable polydimethylsiloxanes include diols of the formula:

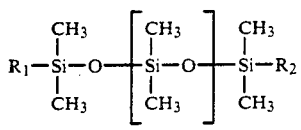

wherein: n is an integer from 0 to 100, preferably from 1 to 50, and more preferably from 10 to 20, and
$R_1$ and $R_2$ which may be the same or different, are wherein:

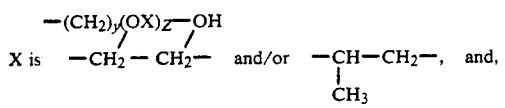

Y is an integer of from 2 to 12, preferably 2 to 4, and more preferably 3, and
Z is an integer of from 0 to 25, preferably 5 to 15, and more preferably 11 or 12, and
triols of the formula:

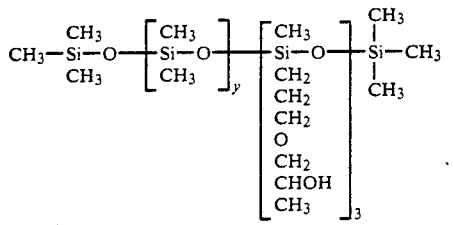

wherein y is an integer from 40 to 150, particularly 50 to 75.

Compounds containing a hydrophilic centre and at least two isocyanate or isocyanate-reactive groups which may be used in the preparation of the prepolymer in order to provide water-dispersibility have been described in the prior art and may be of the ionic, ionic precursor or nonionic type.

Compounds containing an ionic hydrophilic centre and at least two isocyanate or isocyanate-reactive groups particularly include polyols and polyamines containing ionic groups which may be cationic, for example quaternary ammonium, quaternary phosphonium or ternary sulphonium salt groups, or anionic, for example salts of sulpho, sulphato, thiosulphato, phospho, phosphono, phosphato or, preferably, carboxy groups.

Compounds containing ionic precursor groups are compounds which contain groups such as carboxylic acid or tertiary amino groups which may readily be converted to ionic groups by simple chemical reactions such as neutralisation or quaternisation. Specific examples of compounds containing ionic precursor groups and two or more isocyanate-reactive groups include triethanolamine and N-methyldiethanolamine and their oxyalkylation and polyesterification products, trimethylopropane monophosphate and monosulphate, bis-hydroxymethyl-phosphinic acid, diaminocarboxylic acids, for example, lysine, cystine and 3,5-diamino benzoic acid, 2,6-dihydroxybenzoic acid and especially dihydroxyalkanoic acids, for example 2,2-dimethylolpropionic acid.

Compounds containing a nonionic hydrophilic centre and at least two isocyanate or isocyanate-reactive groups include diols and/or diisocyanates having pendent polyoxyethylene chains.

Diols and diisocyanates having pendent polyoxyethylene chains which may be used in the preparation of the prepolymer include those described in the prior art, for example in U.S. Pat. No. 3905929 and in U.S. Pat. No. 3920598, respectively. These diols and diisocyanates, because of their function, may be regarded as dispersing diols and diisocyanates.

If desired, compounds containing hydrophilic centres of the ionic or ionic precursor type may be used together with compounds containing hydrophilic centres of the nonionic type in preparing the prepolymers.

In addition to the polydialkylsiloxane and the compound containing a hydrophilic centre, one or more other compounds containing a plurality of isocyanate-reactive groups may be used in preparing the prepolymer if desired. A suitable additional isocyanate-reactive compound comprises an organic polyol, particularly a diol or triol, or mixture thereof, having a molecular weight in the range 62 to 6000 and being free from silicon atoms and hydrophilic centres.

The polyols may be members of any of the chemical classes of polymeric polyols used or proposed to be used in polyurethane formulations. In particular, the polyols may be polyesters, polyesteramides, polyethers, polythioethers, polycarbonates, polyacetals or polyolefins. Preferred polyol molecular weights are from 700 to 3000.

The polydialkylsiloxane suitably constitutes from 1 to 99%, preferably from 5 to 75%, by weight based on the total weight of polydialkylsiloxane and silicon-free polyol (if employed).

The isocyanate-terminated polyurethane prepolymers of the invention may be prepared in conventional manner by reacting a stoichiometric excess of the organic polyisocyanate with the isocyanate-reactive polydialkylsiloxane, the compound containing a hydrophilic centre and, if desired, one or more silicon-free polyols as described above, under substantially anhydrous conditions at a temperature between about 30° C. and about 130° C. until reaction between the isocyanate groups and the active hydrogen groups is substantially complete. The polyisocyanate and the active hydrogen containing components are suitably reacted in such proportions that the ratio of number of isocyanate groups to the number of isocyanate-reactive groups is in the range from about 1.1:1 to about 6:1, preferably within the range from 1.5:1 to 3:1.

If desired, catalysts for urethane formation such as dibutyltin dilaurate and stannous octoate may be used to assist prepolymer formation and a non-reactive solvent may be added before or after prepolymer formation to control the viscosity. Suitable non-reactive solvents which may be used include acetone, methylethylketone, dimethylformamide, ethylene carbonate, propylene carbonate, diglyme, N-methylpyrrolidone, ethyl acetate, ethylene and propylene glycol diacetates, alkyl ethers of ethylene and propylene 15 glycol monoacetates, toluene, xylene and sterically hindered alcohols such as t-butanol and diacetone alcohol. The preferred solvents are water-miscible solvents such as N-methylpyrrolidone, dimethyl sulphoxide and dialkyl ethers of glycol acetates or mixtures of N-methylpyrrolidone and methyl ethyl ketone. Other suitable solvents include vinyl monomers which are subsequently polymerised.

The isocyanate-terminated polyurethane prepolymers of the invention are water dispersible, and an abherent medium comprising an aqueous polyurethane dispersion may be prepared by dispersing the water dispersible, isocyanate-terminated polyurethane prepolymer in an aqueous medium, preferably in the presence of an effective amount of a polyfunctional active hydrogen-containing chain extender.

The prepolymer may be dispersed in water using techniques well known in the art. Preferably, the prepolymer is added to the water with agitation or, alternatively, water may be stirred into the prepolymer.

Conversion of any ionic precursor groups, for example carboxy groups, in the prepolymer to ionic (salt) groups may be effected before, simultaneously with, or after, the addition of the prepolymer to water. The agent used to effect neutralisation of a carboxy group may suitably be a tertiary amine such as triethylamine, triethanolamine or N-methylmorpholine, an alkaline hydroxide such as sodium or potassium hydroxide or a quaternary ammonium hydroxide.

The polyfunctional active hydrogen-containing chain extender is preferably water-soluble, and water itself may be effective. Other suitable extenders include a polyol, an amino alcohol, ammonia, a primary or secondary aliphatic, alicyclic, aromatic, araliphatic or eterocyclic amine especially a diamine, hydrazine or a substituted hydrazine.

Examples of suitable chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, tris(2-aminoethyl) amine, 3,3',-dinitrobenzidine, 4,4'-methylenebis(2-chloroaniline), 3,3'-dichloro-4,4'bi-phenyl diamine, 2,6-diaminopyridine, 4,4'-diaminodiphenylmethane, menthane diamine, m-xylene diamine, isophorone diamine, and adducts of diethylene triamine with acrylate or its hydrolyzed products. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulfonic acids such as adipic acid mono- or dihydrazide, oxalic acid dihydrazide, isophthalic acid dihydrazide, tartaric acid dihydrazide, 1,3-phenylene disulfonic acid dihydrazide, omega-amino-caproic acid dihydrazide, hydrazides made by reacting lactones with hydrazine such as gamma-hydroxylbutyric hydrazide, bis-semi-carbazide, bis-hydrazide carbonic esters of glycols such as any of the glycols mentioned above.

Where the chain extender is other than water, for example a diamine or hydrazine, it may be added to the aqueous dispersion of prepolymer or, alternatively, it may already be present in the aqueous medium when the prepolymer is dispersed therein.

Desirably, the polyfunctional chain extender should be capable of intra-molecular cross-linking, to improve durability and resistance to solvents. Suitable resinous intra-molecular cross-linking agents comprise epoxy resins, alkyd resins and/or condensation products of an amine, e.g. melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines with an aldehyde, e.g. formaldehyde. A useful condensation product is that of melamine with formaldehyde. The condensation product may optionally be partially or totally alkoxylated, the alkoxy group preferably being of low molecular weight, such as methoxy, ethoxy, n-butoxy or iso-butoxy. A hexamethoxymethyl melamine condensate is particularly suitable.

Such polyfunctional extenders preferably exhibit at least trifunctionality (i.e. three functional groups) to promote inter-molecular cross-linking with the functional groups present in the polyurethane prepolymer, and improve adhesion of the abherent coating layer to the film substrate.

In a preferred embodiment of the invention the abherent medium comprises a chain extender and a cross-linking agent.

The chain extension can be conducted at elevated, reduced or ambient temperatures. Convenient temperatures are from about 5° to 95° C. or more, preferably from about 10° to about 45° C.

The amount of chain extender employed should be approximately equivalent to the free-NCO groups in the prepolymer, the ratio of active hydrogens in the chain extender to NCO groups in the prepolymer preferably being in the range from 1.0 to 2.0:1. Of course, when water is employed as the chain extender, these ratios will not be applicable since the water, functioning both as chain extender and dispersing medium, will be present in gross excess relative to the free-NCO groups.

A catalyst is preferably introduced into the abherent medium to accelerate the intra-molecular cross-linking action of the resinous cross-linking agent and also to accelerate its inter-molecular cross-linking action with cross-linkable functional groups in the polyurethane prepolymer. Preferred catalysts for cross-linking melamine formaldehyde include ammonium chloride, ammonium nitrate, ammonium thiocyanate, ammonium dihydrogen phosphate, diammonium hydrogen phosphate, para toluene sulphonic acid, sulphuric acid, maleic acid stabilised by reaction with a base, ammonium para toluene sulphonate and morpholinium para toluene sulphonate.

If desired, the abherent medium may additionally comprise a surfactant to promote spreading thereof when applied to a film substrate.

The substrate to which an abherent medium is applied to yield a release film according to the invention may be formed from any suitable film-forming, polymeric material. Thermoplastics materials are preferred, and include a homopolymer or copolymer of a 1-olefin, such as ethylene, propylene and but-1-ene, a polyamide, a polycarbonate, and particularly a synthetic linear polyester which may be obtained by condensing one or more dicarboxylic acids or their lower alkyl (up to 6 carbon atoms) diesters, e.g. terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols e.g. ethylene glycol, 1,3-propanediol, 1,4-butanediol, neopentyl glycol and 1,4-cyclohexanedimethanol. A polyethylene terephthalate film is particularly preferred, especially such a film which has been biaxially oriented by sequential stretching in two mutually perpendicular directions, typically at a temperature in the range 70° to 125° C., and preferably heat set, typically at a temperature in the range 150° to 250° C., for example—as described in British patent GB-A-838708.

The substrate may also comprise a polyarylether or thio analogue thereof, particularly a polyaryletherketone, polyarylethersulphone, polyaryletheretherketone, polyaryletherethersulphone, or a copolymer or thioanalogue thereof. Examples of these polymers are disclosed in EP-A-1879, EP-A-184458 and U.S. Pat. No. 4008203, particular suitable materials being those sold by ICI Chemicals and Polymers Ltd under the Registered Trade Mark STABAR. Blends of these polymers may also be employed.

Suitable thermoset resin substrate materials include addition—polymerisation resins—such as acrylics, vinyls, bis-maleimides and unsaturated polyesters, formaldehyde condensate resins—such as condensates with urea, melamine or phenols, cyanate resins, isocyanate resins, epoxy resins, functionalised polyesters, polyamides or polyimides.

A film substrate for a release film according to the invention may be unoriented or uniaxially oriented, but is preferably biaxially oriented by drawing in two mutually perpendicular directions in the plane of the film to achieve a satisfactory combination of mechanical and physical properties. Formation of the film may be effected by any process known in the art for producing a polymeric film—for example, a tubular or a flat film process.

In a tubular process simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation.

In the preferred flat film process a film-forming polymer is extruded through a slot die and rapidly quenched upon a chilled casting surface (drum) to ensure that the polymer is quenched to the amorphous state. Orientation is then effected by stretching the quenched extrudate in at least one direction at a temperature above the glass transition temperature of the polymer. Sequential orientation may be effected by stretching a flat, quenched extrudate firstly in one direction, usually the longitudinal direction, i.e. the forward direction through the film stretching machine, and then in the transverse direction. Forward stretching of the extrudate is conventionally effected over a set of rotating rolls or between two pairs of nip rolls, transverse stretching then being effected in a stenter apparatus. Stretching is effected to an extent determined by the nature of the film-forming polymer, for example —a polyester is usually stretched so that the dimension of the oriented polyester film is from 2.5 to 4.5 its original dimension in the, or each, direction of stretching.

A stretched film may be, and preferably is, dimensionally stabilised by heat-setting under dimensional restraint at a temperature above the glass transition temperature of the film-forming polymer but below the melting temperature thereof, to induce crystallisation of the polymer.

The abherent medium, preferably in the form of an aqueous dispersion, may be applied to a substrate film surface by conventional coating techniques. The applied medium, generally having a solids content of from about 20 to 60% by weight, preferably from about 25 to 50% by weight, is subsequently dried to remove the dispersant and also to effect cross-linking of the polyurethane prepolymer. Drying may be effected by conventional techniques—for example, by passing the coated film through a hot air oven. Drying may, of course, be effected during normal post-formation film-treatments, such as heat-setting.

The abherent coating medium may be applied to an already oriented film substrate. However, application of the coating medium is preferably effected before or during any stretching operation.

In particular, it is preferred according to this invention that the abherent medium should be applied to the film between the two stages (longitudinal and transverse) of a biaxial stretching operation. Such a sequence of stretching and coating is especially preferred for the production of linear polyester release films, such as polyethylene terephthalate films, which are preferably firstly stretched in the longitudinal direction over a series of rotating rollers, coated with the abherent medium and then stretched transversely in a stenter oven, preferably followed by heat-setting.

The reverse surface, remote from the abherent layer, of a release film according to the invention may be untreated or may have thereon a functional layer, such as a priming medium, a sealable medium or, particularly, an adhesive composition, such as an asphalt shingle adhesive of the kind normally obtained as a solid, coke-like residue from a petroleum cracking process.

The release films of the invention may conveniently contain any of the agents conventionally employed in the manufacture of polymeric films. Thus, agents such as dyes, pigments, lubricants, anti-oxidants, antistatic agents, surface active agents, gloss-improvers, prodegradants, fire-retardants, and ultra-violet light stabilisers may be incorporated in the substrate and/or abherent coating layer, as appropriate.

The release films may vary in thickness depending on the intended application, but films having a total thickness of from 5 to 250, particularly from 10 to 50 $\mu$m are of general utility. The dry thickness of the abherent layer is desirably within a range of from 0.01 to 10, preferably 0.02 to 1.0 $\mu$m.

The abherent coatings provided by the invention have low coefficients of friction, excellent wear resistance, and offer effective release from adhesives. They are also characterised by excellent water resistance, low surface tension, excellent retention of low temperature properties and improved lubricity.

Release films according to the invention are of general applicability and may be employed, inter alia, in the production of moulded articles from curable resins. In particular, the release films are of utility as release tapes for asphalt roofing materials.

Figure 2:
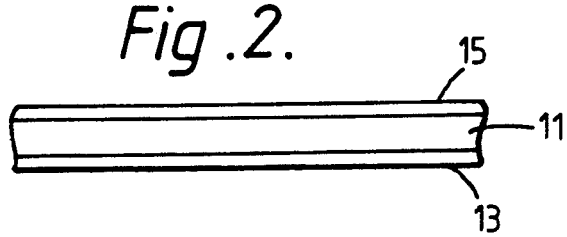
Figure 3:
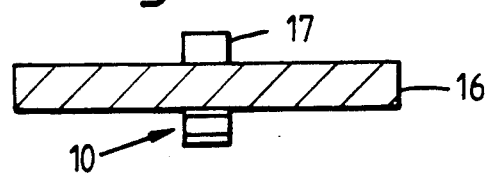
Figure 4:
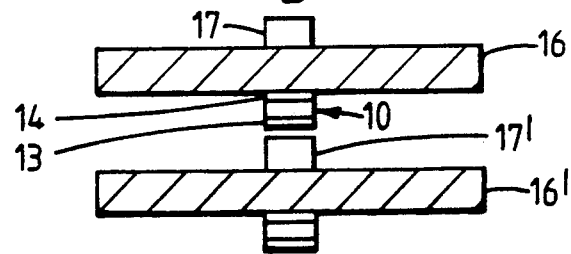
Figure 5:
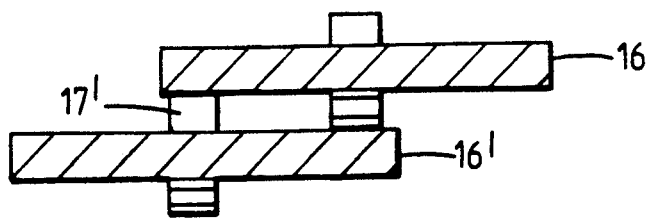

The invention is illustrated by reference to the accompanying drawings in which:

FIG. 1 is a schematic elevation (not to scale) of a portion of a release film 10 comprising an oriented polyester film support 11 having on one surface 12 thereof an abherent layer 13, the remote surface 14 of the substrate film being uncoated, FIG. 2 is a similar fragmentary schematic elevation in which an adhesive coating layer 15 is provided on remote surface 14 of the substrate film, FIG. 3 is an elevation of an asphalt roofing shingle 16 having an adhesive strip element 17 across the central upper surface thereof, and a release film strip 10 adhesively bonded across the central lower surface thereof, FIG. 4 represents a stack of such shingles, only two shingles 16,16' being shown, and FIG. 5 represents two shingles 16,16' arranged in an operative position.

Referring particularly to FIG. 4 of the drawings, a plurality of shingles, two of which 16,16' are shown, are arranged in a vertical stack, as for storage, the abherent layer 13 of release film tape 10, attached by adhesive layer 14 to the underside of shingle 16, engaging adhesive element 17' on the upper surface of the second shingle 16'. The presence of release tape 10 prevents unwanted adherence between adjacent shingles under the pressure generated by the component shingles in the stack. It will be appreciated that the relative dimensions of the release film 10, adhesive layer 17 and 25 shingle 16, as illustrated, are distorted for the sake of clarity.

When required for use, the shingles are easily removed from the stack, the abherent layer 13 of release tape 10 facilitating separation of one shingle (e.g. 16) from an adjacent shingle (e.g. 16') despite engagement with an adjacent adhesive layer (e.g. 17'). The separated shingles may then be assembled in the required arrangement, for example—as shown in FIG. 5, with adhesive layer 17' on the central upper surface of shingle 16' engaging an edge portion of the lower surface of overlying shingle 16 to create an overlapping roof-like structure. When activated, for example—by pressure or thermal (solar) energy, adhesive layer 17', no longer engaging an abherent layer, bonds together the two adjacent shingles thereby reducing the risk of storm damage when the structure is exposed to the elements.

The invention is further illustrated by references to the following Example.

EXAMPLE I

A molten web of polyethylene terephthalate was extruded in a conventional manner from a slot die on to the polished surface of a cooled rotating drum upon which the web was quenched to below the glass transition temperature of the polymer to provide an amorphous film. The quenched film was then reheated and drawn about 3.5 times its original length in the longitudinal direction at a temperature of about 80° C.

An abherent coating medium comprising an aqueous latex having the following composition was prepared, parts being calculated by volume:

| | |
|---|---|
| 40% w/w aqueous dispersion of a polymer ade from polypropylene glycol, dimethylol propionic acid, isophorone diisocyanate and 9% pendant polydimethylsiloxane (Neorez 22B29) | 12.5 parts |
| 10% w/v aqueous solution of melamine formaldehyde (Cymel 350) | 10 parts |
| 10% w/v ammonium p toluene sulphonate | 1 part |
| 27.5% w/v nonyl phenol ethoxylate (Synperonic N) | 5 parts |
| Deionised water | 87.5 parts |

The aqueous abherent medium was applied to one surface of the uniaxially oriented film by a roller coating technique, the applied wet coat thickness being 2 μm. The coated film was then passed through a hot air oven maintained at a temperature of 95° C. to dry and cure the coating.

The dried film was then drawn about 3.5 times its original width in the transverse direction at a temperature of about 95° C. in a stenter apparatus. Finally, the film was heat set at a temperature of about 200° C.

The resultant release film comprised an abherent layer of about 0.05 μm thickness supported on a biaxially oriented polyethylene terephthalate substrate film of 12 μm thickness.

The abherent coating layer was found to stick securely to the polyester substrate film, and to provide good release properties from an adhesive composition obtained as a solid coke-like residue from the cracking process in the refining of petroleum, and used as an asphalt roofing felt adhesive (shingle adhesive).

EXAMPLE 2

Release film was prepared using the procedure described in Example 1 except that the following abherent coating medium was used, parts being calculated by volume:

| | |
|---|---|
| 40% w/w aqueous dispersion of a polymer made from polypropylene glycol, dimethylol propionic acid, isophorone diisocyanate and 9% pendant polydimethylsiloxane (Neorez 22B29) | 11.2 parts |
| 10% w/v aqueous solution of melamine formaldehyde (Cymel 350) | 9.0 parts |
| 10% ammonium p toluene sulphonate | 0.9 parts |
| 27.5% w/v nonyl phenol ethoxylate (Synperonic N) | 4.5 parts |
| Deionised water | 74.4 parts |

Uncoated biaxially oriented polyethylene terephthalate film of 12 μm thickness was coated with molten asphalt and reeled up. Lengths of the asphalt-coated film were subsequently pulled from the reel and heat sealed for 10 seconds at 120° C. to the coated side of the prepared release film.

Each sample had a sealed area of 25 mm by 25mm, with an unsealed 'tail' at least 100 mm long. The degree of release was measured by peeling apart each specimen using an 'Instron' A0533 Tensometer at a peel speed of 200 mm min$^{-1}$.

The peel strength of the release coated film was also measured using Finecal Crossweave Filament-reinforced strapping tape, instead of the asphalt-coated polyethylene terephthalate film.

The results are given in Table 1.

EXAMPLE 3

This is a comparative Example not according to the invention.

The procedure of Example 1 was repeated except that the polyethylene terephthalate film was not coated with a release medium. The degree of release was measured as described in Example 2, using both asphalt coated polyethylene terephthalate film and strapping tape.

TABLE 1

| | Peel Strength g/25 mm (Nm$^{-1}$) | |
|---|---|---|
| Example | Asphalt | Strapping tape |
| 2 | 210 (82.4) | 695 (272.8) |
| 3 (Comparative) | 4000 (1570) | 3700 (1452) |

The results illustrate that the abherent coating layer provides good release properties from an adhesive composition comprising asphalt, which can be used as an asphalt roofing felt adhesive (shingle adhesive). The abherent coating layer also provides good release properties from the strapping tape.

EXAMPLE 4

The procedure of Example 2 was repeated except that the abherent coating medium used comprised an aqueous latex having the following composition, parts being calculated by volume:

| | |
|---|---|
| 36% w/w aqueous dispersion of a polymer made from polypropylene glycol, dimethylol propionic acid isophorone diisocyanate and 10% pendant polydimethylsiloxane (Neorez 23P/16B) | 11.2 parts |
| 10% w/v aqueous solution of melamine formaldehyde (Cymel 350) | 9.0 parts |
| 10% w/v ammonium p toluene sulphonate | 0.9 parts |
| 27.5% w/v nonyl phenol ethoxylate (Synperonic N) | 5.0 parts |
| Deionised water | 73.9 parts |

The aqueous abherent medium was applied to one surface of polyethylene terephthalate film, as in Example 2, except that the final film thickness of the polyethylene terephthalate substrate was 100 μm, instead of 12 μm.

The peel strength of the release coated film was measured as described in Example 2, except that only the Finecal Crossweave Filament-reinforced strapping tape was used, and not asphalt-coated polyethylene terephthalate film. The results are given in Table 2.

EXAMPLE 5

This is a comparative Example not according to the invention.

The procedure of Example 4 was repeated except the polyethylene terephthalate film was not coated with a release medium. The results are given in Table 2.

EXAMPLE 6

An abherent coating medium comprising an aqueous latex having the following composition was prepared, parts being calculated by volume:

| | |
|---|---|
| 36% aqueous dispersion of a polymer made from polypropylene glycol, dimethylol propionic acid, isophorone diisocyanate and 10% pendant polydimethylsiloxane (Neorez 23P/16B) | 33.5 parts |
| 10% w/v aqueous solution of melamine formaldehyde (Cymel 350) | 9.0 parts |
| 10% w/v ammonium p toluene sulphonate | 0.9 parts |
| 27.5% w/v nonyl phenol ethoxylate (Synperonic N) | 5 parts |
| Deionised water | 59.7 parts |

The aqueous abherent medium was applied to one surface of a coextruded tubular substrate comprising a polypropylene core layer having a polyethylene/polybutene/polypropylene terpolymer layer on each surface thereof, and the coated substrate was then inflated and drawn to yield a coated biaxially oriented film.

The resultant release film comprised an abherent layer of 0.16 μm thickness on a substrate film of 23 μm thickness.

The peel strength of the release coated polypropylene film was measured as described in Example 2, except that only the Finecal Crossweave Filament-reinforced strapping tape was used, and not asphalt-coated polyethylene terephthalate film. The results are given in Table 2.

EXAMPLE 7

This is a comparative Example not according to the invention.

The procedure of Example 6 was repeated except that the polypropylene film was not coated with a release medium. The results are given in Table 2.

TABLE 2

| Example | Peel Strength g/25 mm (Nm$^{-1}$) |
|---|---|
| 4 | 935 (367.0) |
| 5 (Comparative) | 3200 (1256) |
| 6 | 950 (372.9) |
| 7 (Comparative) | 2405 (944.0) |

I claim:

1. A release film comprising a self-supporting, polymeric film substrate having, on at least one surface thereof, a polymeric abherent layer characterised in that the abherent layer comprises a polyurethane resin which is the reaction product of:
   (A) a prepolymer obtained by reacting:
      (i) an organic polyisocyanate,
      (ii) a polydialkylsiloxane having at least two isocyanate-reactive groups, and
      (iii) a compound containing a hydrophilic centre and at least two isocyanate and/or isocyanate-reactive groups,
   and
   (B) a polyfunctional chain extender.

2. A release film according to claim 1 wherein the polymeric film is a thermoplastics film.

3. A release film according to either of claims 1 and 2 wherein the prepolymer is derived from an additional reactant comprising:
   (iv) at least one organic polyol having a molecular weight in the range 62 to 6000 and being free from silicon atoms and hydrophilic centres.

4. A release film according to claim 1 wherein component (ii) comprises a polydimethyl siloxane diol or triol.

5. A release film according to claim 1 wherein component (iii) comprises 2,2-dimethylol propionic acid.

6. A release film according to claim 1 wherein the polyfunctional chain extender comprises a resinous inter-molecular cross-linking agent.

7. A release film according to claim 6 wherein the chain extender comprises a methoxymethyl melamine.

8. A release film according to claim 1 wherein the substrate comprises a biaxially oriented polyethylene terephthalate film.

9. An asphalt roofing sheet or shingle having an adhesive element on a first surface thereof and a release tape on the second surface thereof, the release tape being positioned to engage with the adhesive element on an adjacent sheet or shingle when the sheets or shingles are stacked, characterised in that the release tape comprises a release film according to claim 1.

* * * * *